United States Patent [19] [11] Patent Number: 4,731,406
Itoh et al. [45] Date of Patent: * Mar. 15, 1988

[54] FLAME-RETARDANT LOW-SMOKING RUBBER COMPOSITION

[75] Inventors: Kunio Itoh; Tsutomu Nakamura; Ken-ichi Takita, all of Annaka, Japan

[73] Assignee: Shin-Etsu Chemical Co., Ltd., Tokyo, Japan

[*] Notice: The portion of the term of this patent subsequent to Jan. 6, 2004 has been disclaimed.

[21] Appl. No.: 942,388

[22] Filed: Dec. 16, 1986

[30] Foreign Application Priority Data

Dec. 18, 1985 [JP] Japan ................. 60-284770

[51] Int. Cl.⁴ ................................... C08K 3/22
[52] U.S. Cl. ..................... 524/436; 524/437
[58] Field of Search ............. 525/101, 106; 524/436, 524/437

[56] References Cited

U.S. PATENT DOCUMENTS

| 3,793,288 | 2/1974 | Elder | 524/425 |
| 4,353,997 | 10/1982 | Keogh | 524/436 |
| 4,373,048 | 2/1983 | Schubert et al. | 524/437 |
| 4,420,580 | 12/1983 | Herman et al. | 524/436 |
| 4,430,470 | 2/1984 | Taniguichi et al. | 252/609 |
| 4,533,687 | 8/1985 | Itoh et al. | 525/106 |
| 4,560,719 | 12/1985 | Nakamura et al. | 524/437 |

Primary Examiner—Veronica P. Hoke
Attorney, Agent, or Firm—Hopgood, Calimafde, Kalil, Blaustein & Judlowe

[57] ABSTRACT

Vulcanizates of so-called EPM and EPDM rubber compositions can be imparted with greatly improved flame retardancy and emit a greatly decreased volume of smoke in burning when the rubber composition is compounded with a conventional flame retardant agent of aluminum or magnesium hydroxide together with a polymer of an acrylic acid ester and an organopolysiloxane in combination or a copolymer composed of the moieties of these two kinds of monomeric units in a limited weight proportion.

2 Claims, No Drawings

FLAME-RETARDANT LOW-SMOKING RUBBER COMPOSITION

BACKGROUND OF THE INVENTION

The present invention relates to a rubber composition or, more particularly, to a highly flame-retardant rubber composition based on a copolymer of ethylene and propylene emitting a remarkably small volume of smoke even when it is set on fire.

Various kinds of synthetic rubbers based on a copolymer of monomers comprising ethylene and propylene, referred to generally as EP rubbers hereinbelow, including copolymers of ethylene and propylene, referred to as EPM rubbers hereinbelow, and copolymers of ethylene, propylene and a diene monomer, referred to as EPDM rubbers hereinbelow, are known and widely used as an electric insulating material by virtue of their excellent heat resistance, weatherability and electric properties. Since these rubbery polymers are inherently inflammable, it is usual in the application thereof to an electric insulation use that the rubber is compounded with a large amount of a halogen-containing compound as a flame retardant.

The addition of such halogen-containing flame retardants is of course very detrimental to the heat resistance and mechanical properties of the rubber composition inherent in the EPM and EPDM rubbers. Moreover, a rubber composition compounded with a large amount of a halogen-containing flame retardant is very disadvantageous from the standpoint of safety, health of human body and environmental pollution when it is set on fire because combustion of such a rubber composition necessarily produces a large volume of toxic or corrosivce gas as well as a large volume of smoke.

An alternative flame retardant of the above mentioned halogen-containing compounds is red phosphorus although the effect of flame retardancy obtained thereby is relatively low in comparison with halogen-containing compounds in addition to the still larger adverse effects on the heat resistance and mechanical properties of the rubber composition than halogen-containing compounds. Moreover, the improvement in the smoke emission is also insufficient by compounding the rubber with red phosphorus.

SUMMARY OF THE INVENTION

An object of the present invention is therefore to provide a highly flame-retardant rubber composition based on an EP rubber emitting a remarkably small volume of smoke even when it is set on fire free from the above described problems and disadvantages in the prior art rubber compositions.

The flame-retardant and low-smoking rubber composition based on a copolymer of ethylene and propylene provided by the present invention comprises:

(a) 100 parts by weight of a rubbery copolymer of monomers comprising ethylene and propylene;
(b) from 10 to 150 parts by weight of a combination of
  (b-1) from 20 to 80% by weight of a polymer of an acrylic acid ester and
  (b-2) from 80 to 20% by weight of an organopolysiloxane, or from 10 to 150 parts by weight of (b-3) a copolymer essentially composed of from 20 to 80% by weight of a moiety of an acryclic acid ester and from 80 to 20% by weight of a moiety of an organopolysiloxane; and
(c) aluminum hydroxide, magnesium hydroxide or a combination thereof in an amount in the range from 30 to 150% by weight based on the total amount of the components (a) and (b).

DETAILED DESCRIPTION OF THE PREFERRED EMBODIMENTS

As is understood from the above given summary of the invention, the flame retardancy and low smoke emission of the inventive EP rubber-based composition is achieved when the component (c), i.e. aluminum and/or magnesium hydroxides, which is rather conventional as a flame retardant agent in rubber compositions, is combined with the specific component (b) to exhibit a synergistic effect. The effectiveness of the combination of the components (b) and (c) is so remarkable as to be comparable with the effects obtained by compounding the EP rubber with a large amount of a halogen- or phosphorus-containing compound as a flame retardant without influencing the excellent properties inherent in EP rubbers. Accordingly, the rubber composition of the invention is very useful as a material for electric insulation of electric cables in vehicles and vessels, for insulating various parts in electric instruments and appliances, for sealing and heat-insulation in buildings and so on.

The basic ingredient in the inventive rubber composition is the component (a) which is a copolymer of the monomers comprising ethylene and propylene including EPM and EPDM rubbers. In particular, the copolymer should comprise from 10 to 70% or, preferably, from 15 to 50% by moles of the monomeric units derived from propylene, the other monomeric units being derived from ethylene and, optionally, a diene monomer. The diene monomer in the EPDM rubbers may preferably be dicyclopentadiene or ethylidene norbornene although other diene monomers can be used without particular limitations.

The component (b) in the inventive rubber composition is either a combination of two types of polymeric materials (b-1) and (b-2) or a copolymer (b-3). The component (b-1) is a polymer of an acrylic acid ester exemplified by ethyl acrylate, butyl acrylate, methoxyethyl acrylate, ethoxyethyl acrylate, cyanoalkyl acrylates, hydroxyethyl acrylate and the like. The polymer may be a copolymer of two kinds or more of these acrylic acid esters. Since the component (b-1) should preferably be co-crosslinkable with the EP rubber as the component (a), the polymer should desirably have at least two functional groups in a molecule pertaining to the crosslinking reaction such as aliphatically unsaturated groups. In this regard, the component (b-1) is preferably a copolymer of the acrylic acid ester or esters with a small amount of a diene monomer such as cyclopentadiene, ethylidene norbornene, propenyl norbornene and dicyclopentadienyl acrylate as well as vinylsilyl-substituted acrylic acid ester such as (vinyl dimethyl silyl) methyl acrylate and 1,5,7-trivinyl-1,3,5,7-tetramethyl-3-(3(acryloxypropyl) cyclotetrasiloxane. It is sometimes also advantageous that the copolymer as the component (b-1) contains monomeric units derived from acrylonitrile or acrylamide.

The organopolysiloxane as the component (b-2) combined with the above described component (b-1) to form the component (b) is composed of one or more kinds of various organosiloxane units including those expressed by the formulas denoting methyl, phenyl and vinyl groups with Me, Ph and Vi, respectively: $Me_2SiO$; $Ph_2SiO$; $MePhSiO$; $MeViSiO$;

Me(HSCH$_2$CH$_2$CH$_2$)SiO; MeSiO$_{1.5}$; PhSiO$_{1.5}$; ViSiO$_{1.5}$; (HSCH$_2$CH$_2$CH$_2$)SiO$_{1.5}$; Me$_3$SiO$_{0.5}$; MePh$_2$SiO$_{0.5}$; and Me$_2$ViSiO$_{0.5}$. The component (b-2) may be a mixture of two kinds or more of organopolysiloxanes composed of different types or different combinations of the above listed organosiloxane units. The organopolysiloxane may be resinous, oily or gummy without particular limitations although an additional advantage in respect of the flame retardancy of the composition is obtained by using an organopolysiloxane in an oily form since an oily organopolysiloxane may serve in place of the paraffinic or naphthenic process oils conventionally used in rubber compositions as a processing aid.

It is also preferable that the organopolysiloxane is co-crosslinkable with the EP rubber as the component (a) and, further, with the polymer of the acrylic acid ester as the component (b-1). In this regard, the organopolysiloxane should preferably have at least two functional groups such as vinyl capable of pertaining to the crosslinking reaction.

Alternatively, the component (b) may be a copolymer (b-3) composed of the monomeric units corresponding to the above described components (b-1) and (b-2). Several types of such copolymers comprising the monomeric units derived from an acrylic acid ester and an organopolysiloxane are known in the prior art including the copolymers prepared by the graft polymerization of an acrylic monomer on to the aliphatically unsaturated groups, mercapto groups and the like in an organopolysiloxane as disclosed in Japanese Patent Publication 52-12231, partially co-crosslinked polymers of the above described components (b-1) and (b-2), copolymers of an acrylic monomer and a diorganopolysiloxane having acrylic unsaturation at the molecular chain ends, so-called comb polymer-type copolymers and so on.

The amount of the component (b), i.e. combination of the components (b-1) and (b-2) or component (b-3), in the inventive rubber composition should be in the range from 10 to 150 parts by weight per 100 parts by weight of the EP rubber as the component (a). When the amount of the component (b) is too small, no sufficient improvement can be obtained in the flame retardancy and reduction of smok emission of the rubber composition when it is set on fire. When the amount thereof is too large, on the other hand, the rubber composition can give no vulcanizates having sufficiently high mechanical strengths. When the component (b) is a combination of the components (b-1) and (b-2), the weight proportion of the component (b-1) to (b-2) should preferably be in the range from 80:20 to 20:80 in view of the synergistic effect thereof on the improvement of flame retardancy. When the component (b) is a copolymer (b-3), similarly, the weight proportion of the monomeric units derived from the acrylic acid ester and those derived from the organopolysiloxane also should preferably be in the range from 80:20 to 20:80.

The component (c) is a hydroxide of aluminum or magnesium conventionally used as a flame retardant in rubber compositions. These hydroxides may be used in combination as a matter of course. Any of commercial products of these hydroxides may be used without particular limitations provided that the average particle diameter thereof is in the range from 0.1 to 30 μm. The amount of the component (c) in the inventive rubber composition should preferably be in the range from 30 to 150% by weight based on the total amount of the components (a) and (b). Although the component (c) can be blended with the components (a) and (b) in a conventional manner, it is sometimes advantageous in respect of the further improved electric properties and heat resistance of the vulcanizates obtained from the inventive rubber composition that the hydroxide is used as an adsorbent or carrier of the organopolysiloxane as the component (b-2) by treating the hydroxide beforehand wit the organopolysiloxane to cause adsorption or bonding therebetween.

The rubber composition of the invention can be obtained by merely blending the above described components each in a calculated and weighed amount and uniformly milling the mixture using a rubber blending machine such as two-roller mills, Banbury mixers, kneaders and the like. It is of course optional that the inventive rubber composition is further admixed with various kinds of known additives including, for example, reinforcing fillers, e.g. finely divided silica fillers and carbon blacks, having a specific surface area of at least 50 m$^2$/g and non-reinforcing fillers, e.g. diatomaceous earth, talc, mica, quartz powder, graphite powder and glass fiber, together with or without a carbon-functional silane compound as well as antioxidants, ultraviolet absorbers, pigments and so on according to need.

The inventive rubber composition prepared in the above described manner should be further admixed, prior to vulcanization by heating under compression, with a vulcanizing agent which may be an organic peroxide, sulfur or a sulfur compound although it is a possible way that the rubber composition without admixture of a vulcanizing agent is vulcanized by the irradiation with actinic rays such as high-energy radiations. An alternative type of the vulcanizing agent admixed with the rubber composition is a combination of an organohydrogenpolysiloxane and a catalytic amount of a platinum compound so that crosslinks are formed by the so-called hydrosilation between the silicon-bonded hydrogen atoms in the organohydrogenpolysiloxane and the residual aliphatic unsaturation in the components (a) and/or (b).

The vulcanizates of the inventive rubber composition obtained in this manner have flame retardancy of about the same degree as or even higher than that of the conventional EP rubber-based vulcanizates with admixture of a large amount of a halogen-containing flame retardant agent. Moreover, the smoke emission from the vulcanizate set on fire is only about 30% or less in comparison with conventional vulcanizates so that various kinds of rubber-made articles for industrial and household uses can be manufactured from the inventive rubber compositions.

In the following, the rubber composition of the invention is described in more detail by way of examples and comparative examples, in which the term "parts" always refers to "parts by weight".

EXAMPLES 1 and 2 and COMPARATIVE
EXAMPLES 1 to 3

A rubber composition was prepared in each of these Examples and Comparative Examples by uniformly blending an EPM rubber (EP-43, a product by Japan Synthetic Rubber Co.) in an amount indicated in Table 1 below, 100 parts of aluminum hydroxide having an average particle diameter of 0.5 μm, 30 parts of finely-divided reinforcing silica filler (Nipsil VN$_3$, a product by Nippon Silica Co.), 3 parts of carbon black and 2 parts of an organosilane compound (SI-69, a product by DEGUSSA Co., West Germany) together with or without further addition of an acrylic rubber (AR-201, a product by Japan Synthetic Rubber Co.), an organopolysiloxane gum composed of 99.5% by moles of dimethylsiloxane units $(CH_3)_2SiO$ and 0.5% by moles of methylvinylsiloxane units $(CH_3)(CH_2=CH)SiO$, decabromodiphenyl ether and antimony trioxide $Sb_2O_3$ each in an amount indicated in Table 1 when added.

Each of the thus prepared rubber compositions was further admixed with 4% by weight of a powdery mixture of calcium carbonate containing 40% by weight of dicumyl peroxide as a vulcanizing agent and subjected to compression molding at 160° C. under a pressure of 100 kg/cm² for 15 minutes to give a vulcanized rubber sheet having a thickness of 2 mm, which was post-cured at 150° C. for 4 hours. The vulcanized rubber sheets were subjected to the evaluation of flame retardancy and smoking behavior by the determination of the oxygen index according to the procedure specified in JIS K 7201 and the smoke index which was a relative value of the smoke taking the rubber sheet prepared in Comparative Example 3 as the reference when the rubber sheet was heated and burnt in an electric furnace.

TABLE 1

|  | Example | | Comparative Example | | |
|---|---|---|---|---|---|
|  | 1 | 2 | 1 | 2 | 3 |
| EP rubber | 70 | 60 | 100 | 80 | 100 |
| Acrylic rubber | 10 | 10 | — | — | — |
| Organopolysiloxane gum | 20 | 30 | — | 20 | — |
| Decabromodiphenyl ether | — | — | — | — | 30 |
| $Sb_2O_3$ | — | — | — | — | 15 |
| Oxygen index | 32 | 36 | 23 | 27 | 30 |
| Smoke index | 0.37 | 0.33 | 0.70 | 0.51 | 1.00 |

EXAMPLES 3 to 5 and COMPARATIVE EXAMPLE 4

A rubber composition was prepared in each of these Examples and Comparative Example by uniformly blending an EPDM rubber (P-1320, a product by Sumitomo Chemical Industry Co.) in an amount indicated in Table 2 below, 100 parts of the same aluminum hydroxide, 20 parts of the same reinforcing silica filler, 3 parts of the same carbon black and 2 parts of the same organosilane compound each as used in the preceding examples together with or without an acrylic rubber which was a copolymer of ethyl acrylate, butyl acrylate, methoxyethyl acrylate and vinyl dimethyl 3-acryloxypropyl silane in a weight proportion of 50:25:24:1, the same organopolysiloxane gum as used in Examples 1 and 2 and an organopolysiloxane resin composed of two kinds of monofunctional units of $(CH_3)_2(CH_2=CH)SiO_{0.5}$ and $(CH_3)_3SiO_{0.5}$ and tetrafunctional units of $SiO_2$ with a molar ratio of monofunctional to tetrafunctional units of 0.8 and containing 3% by weight of the vinyl groups each in an amount indicated in Table 2 when added.

These rubber compositions were admixed with the vulcanizing agent and vulcanized into rubber sheets in the same manner as in the preceding examples and the vulcanized rubber sheets were subjected to the evaluation of the flame retardancy and smoking behavior to give the values of the oxygen index, smoke index and flame retardancy according to the standard of UL-94 shown in Table 2.

TABLE 2

|  | Example | | | Comparative Example |
|---|---|---|---|---|
|  | 3 | 4 | 5 | 4 |
| EP rubber | 70 | 70 | 70 | 80 |
| Acrylic rubber | 5 | 10 | 15 | 20 |
| Organopolysiloxane gum | 15 | 13 | 15 | — |
| Organopolysiloxane resin | 10 | 7 | 10 | — |
| Oxygen index | 26 | 35 | 36 | 23 |
| Smoke index | 0.53 | 0.34 | 0.30 | 0.62 |
| Flame retardancy, UL-94 | Burnt to V-I | V-I | V-O | Burnt |

EXAMPLES 6 to 9 and COMPARATIVE EXAMPLES 5 and 6

A rubber composition was prepared in each of these Examples and Comparative Examples by uniformly blending an EPDM rubber (P-1320, supra) in an amount indicated in Table 3 below, aluminum hydroxide, magnesium hydroxide or a combination thereof each in an amount indicated in the table, 15 parts of a reinforcing silica filler (Nipsil VN3, supra), 5 parts of zinc oxide, 1 part of stearic acid and 2 parts of an organosilane compound (SI-69, supra) together with or without an acrylic rubber (AR-201, supra), a silicone fluid having a viscosity of 500,000 centistokes at 25° C. and composed of 89.5% by moles of dimethylsiloxane units $(CH_3)_2SiO$, 10% by moles of diphenylsiloxane units $(C_6H_5)_2SiO$ and 0.5% by moles of methyl 3-mercaptopropyl siloxane units $(CH_3)(HSCH_2CH_2CH_2)SiO$ and a paraffin oil each in an amount indicated in Table 3. The aluminum hydroxide was of the same grade as used in the preceding examples while the magnesium hydroxide was a commercial product having an average particle diameter of about 1 μm (#200, a product by Asahi Glass Co.).

Each of these rubber compositions was admixed with zinc di-n-butyl dithiocarbamate (Socuminol BZ, a trade name), tetramethylthiuram disulfide, dipentamethylenethiuram hexasulfide, 2-mercapto benzothiazole and sulfur in amounts of 2.0, 0.5, 0.5, 1.0 and 1.5% by weight, respectively, as vulcanizing agents and subjected to compression molding at 160° C. for 20 minutes under a pressure of 100 kg/cm² to give a vulcanized rubber sheet having a thickness of 2 mm. These vulcanized rubber sheets were subjected to the measurement of the mechanical properties and evaluation of the flame retardancy and smoking behavior to give the results shown in Table 3.

TABLE 3

|  | Example | | | | Comparative Example | |
|---|---|---|---|---|---|---|
|  | 6 | 7 | 8 | 9 | 5 | 6 |
| EP rubber | 70 | 60 | 70 | 60 | 80 | 100 |
| Acrylic rubber | 10 | 20 | 10 | 20 | 20 | — |
| Silicone fluid | 20 | 20 | 20 | 20 | — | — |
| Aluminum hydroxide | 100 | 120 | 70 | — | 100 | 150 |
| Magnesium hydroxide | — | — | 30 | 120 | — | — |
| Paraffin oil | — | — | — | — | — | 20 |
| Hardness, JIS | 68 | 70 | 70 | 72 | 74 | 76 |
| Ultimate elongation, % | 546 | 487 | 505 | 405 | 605 | 620 |
| Tensile strength, kg/cm² | 94 | 90 | 87 | 75 | 101 | 120 |
| Tear strength, kg/cm | 38 | 33 | 35 | 30 | 33 | 36 |
| Oxygen index | 34 | 38 | 30 | 37 | 25 | 28 |
| Smoke index | 0.35 | 0.31 | 0.38 | 0.33 | 0.61 | 0.57 |
| Flame retardancy, | V-I | V-O | V-O | V-I | Burnt | Burnt |

TABLE 3-continued

|  | Example | | | | Comparative Example | |
| --- | --- | --- | --- | --- | --- | --- |
|  | 6 | 7 | 8 | 9 | 5 | 6 |
| UL-94 | | | | | | |

What is claimed is:

1. A flame-retardant and low-smoking rubber composition which comprises:
   (a) 100 parts by weight of a rubbery copolymer of monomers comprising ethylene and propylene;
   (b) from 10 to 150 parts by weight of a combination of
      (b-1) from 20 to 80% by weight of a polymer of an acrylic acid ester and
      (b-2) from 80 to 20% by weight of an organopolysiloxane, or from 10 to 150 parts by weight of (b-3) a copolymer essentially composed of from 20 to 80% by weight of a moiety of an acryclic acid ester and from 80 to 20% by weight of a moiety of an organopolysiloxane; and
   (c) aluminum hydroxide, magnesium hydroxide or a combination thereof in an amount in the range from 30 to 150% by weight based on the total amount of the components (a) and (b).

2. The flame-retardant and low-smoking rubber composition as claimed in claim 1 wherein the copolymer as the component (a) is a copolymer of ethylene and propylene or a copolymer of ethylene, propylene and a diene monomer.

* * * * *